Sept. 27, 1960

E. AZARI ET AL 2,954,226

CARD PROCESSING APPARATUS

Filed May 5, 1958

INVENTORS:
Eric Azari
Alfred M. Nelson

Attorneys

Sept. 27, 1960 E. AZARI ET AL 2,954,226
CARD PROCESSING APPARATUS
Filed May 5, 1958 4 Sheets-Sheet 4

INVENTORS
Eric Azari
Alfred M. Nelson

Smyth & Roston
Attorneys

United States Patent Office 2,954,226
Patented Sept. 27, 1960

2,954,226

CARD PROCESSING APPARATUS

Eric Azari, Pacific Palisades, and Alfred M. Nelson, Redondo Beach, Calif., assignors to The Magnavox Company, Los Angeles, Calif., a corporation of Delaware Filed May 5, 1958, Ser. No. 733,132

21 Claims. (Cl. 271—5)

The invention relates to apparatus for handling and otherwise processing information storage cards. The invention relates more particularly to an improved card holding station for the cards which includes an improved mechanism for assisting in the transfer of cards from a transport medium into the station.

Data processing systems and apparatus are known which utilize a plurality of separate and discrete cards. Information is stored on these cards, and the apparatus includes means for transporting the cards in succession from one station to another. Suitable transducers are included in the apparatus, and these transducers read the information on the different cards as they are so transported from one station to another, and they also also are used to write new information on the cards.

Apparatus of the type described above is not only capable of reading information on the cards, and of writing new information on them, but it can also be constructed to handle the cards so as to perform on them a multitude of sorting, collating, selecting and other operations. This renders the overall system extremely convenient because the cards can be automatically sorted for any desired operation, and desired cards can be rapidly selected for processing.

It is usual for the data on the separate cards used in the apparatus under discussion to be recorded in accordance with an appropriate binary code. That is, the data on each card is arranged so that each separate bit represents either a binary one or a binary zero. Then, by the suitable arrangement of the bits in different levels of ordinal significance, multi-digit numbers can be sensed from the cards or written on the cards, and these numbers in turn can represent any desired numerical or alphabetical code, or combination of the two.

One manner of establishing the data on the information cards is to provide patterns of punchings. These punchings can be arranged so that the presence of a hole at any predetermined point, represents, for example, a binary one, and the absence of a hole at any selected point may represent, for example, a binary zero. Similar results can be achieved by using magnetic spots, or areas, of a north or a south polarity. With the latter arrangement, the spots having a north polarity may represent, for example, binary one, and those having a south polarity may represent binary zero. When magnetic recordings are used, convenient known types of electromagnetic transducers can be used to read the information on the cards and to write new information on them.

The present invention will be described in the environment of apparatus which utilizes cards having magnetic recordings on them and which uses electromagnetic transducers for processing the cards. It will become apparent, however, as the present description proceeds that the invention will find widespread utility in a large variety of card handling systems and apparatus. In fact, the invention is useful in any apparatus in which it is desired to transfer cards or similar members from a transport medium, and to deposit the cards in a stacked condition in a stationary station.

Most types of card processing apparatus provide for the transfer of cards in and out of one or more card holding stations. The cards are usually retained in the card holding stations in an upright, generally stacked condition. A suitable transport medium is provided in such apparatus for receiving cards from one or more of the card holding stations during any particular operating mode and for transporting the received cards in succession past one or more transducer processing stations. The transport medium then functions to return the cards to the same or different card holding stations, or to deliver them to other portions of the equipment.

The apparatus which will be described in the present specification employs rotatable vacuum pressure drums for transporting the cards to and from the card holding stations and past the transducer processing stations. Each drum, as will be described, is constructed to exhibit a vacuum pressure at its peripheral surface. This vacuum pressure serves to firmly retain the cards on that surface as they are transported by the drum. It is clearly preferable in the apparatus of the type described above that at least some of the stationary card holding stations be reversible. That is, the operational flexibility of the apparatus is increased when at least some of the card holding stations are capable of operating either in a feeding mode in which cards may be fed in succession out of the station to the transport drum or other transport medium; and that the station is capable of operating in a stacking mode in which cards transported by the transport medium to the mouth of the station may be deposited in the station. With such reversible card holding stations, and by the provision of suitable control circuitry for actuating the stations between their operational modes, it is possible for continuous and automatic processing of the cards to be carried out. For example, in a first pass, cards may be fed out of a card holding station A for processing and then deposited in a card holding station B. Then, the operational conditions of the card holding stations may be reversed, and the cards may be automatically returned from station A back to station B without the need for manual handling.

One improved reversible card holding station of the type referred to in the preceding paragraphs is described and claimed, for example, in co-pending application Serial No. 645,639. This application was filed March 12, 1957, in the name of Alfred M. Nelson et al.

Card holding stations of the reversible type described above, and also those of the non-reversible type which are capable of receiving cards from a transport medium, usually include a stack head. In the reversible station, this stack head is movable from a standby position to an operative position adjacent the transport medium, and its function is to arrest cards transported to the mouth of the station by the medium so as to enable such cards to be deposited in the station. In the non-reversible stacking type of station, such a stack head is permanently positioned to arrest all cards transported to the mouth of the station by the transport medium.

A common configuration for the stack head is to provide it with one or more stacking fingers. These fingers extend outwardly from a body portion of the stack head and into close proximity with the transport medium. For example, when a rotatable vacuum pressure drum is used as the transport medium, it is usual to provide such a drum with one or more peripheral grooves. These grooves receive the stacking fingers of the stack head, so that a card transported to the stack head by the drum may ride up over the fingers to be stripped from the periphery of the transport drum and arrested by the body portion of the stack head at the mouth of the card holding station.

It is also usual to provide a stationary pick-off member adjacent the mouth of the card holding station in spaced relationship from the stack head. In fact, the stack head is usually positioned adjacent the trailing wall of the station with respect to the movement of the transport drum, and the pick-off is positioned adjacent the leading wall of the station. However, the spacing of the pick-off from the stack head is made less than the length of a card, for reasons which will become apparent.

Then, when the stack head is in its operative position, each card transported by the transport medium to the mouth of the card holding station moves over the pick-off and into engagement with the stack head. The card is then arrested by the stack head and is held stationary across the mouth of the station with its trailing end extending over the pick-off and held out from the transport medium by the pick-off. This permits the following card to pass up over the pick-off and under the trailing edge of the preceding card. Then the next card is arrested by the body of the stack head, and the preceding card is stripped by it from the transport medium and deposited in the card holding station. This arrangement assures that the cards will be properly deposited in the card holding station in the proper sequence and without becoming jammed or damaged.

Card holding stations constructed in the manner described above have proven to be generally satisfactory. However, under certain conditions the frictional forces set up by the prior art type of pick-offs sometimes have tended to slow up the cards as they are brought to the mouth of the station. This factor limits the rate at which cards can be transported to the station and deposited in the station.

Furthermore, in the prior art arrangements, when a card passes over the pick-off at a card holding station and was arrested by the stack head, there has been a tendency for the rear end of the arrested card to flutter under the influence of the vacuum force exerted on it by the periphery of the transport drum. Then, when the succeeding card has been brought to the mouth of the station, there has been a tendency for the following card to meet the trailing edge of the preceding card and become jammed with it.

An important object of the present invention is to provide an improved card holding station which is capable of rapidly and efficiently depositing cards from a transport medium into its card holder portion. A feature of the invention is the provision of means which allow the cards to be rapidly deposited into the station without any tendency to become jammed or damaged.

More specifically, the improved card holding station of the invention includes a pick-off which is provided with means for establishing a cushion of air over the portion of the member over which the cards ride as they are brought to the mouth of the station by the transport medium. In a manner to be described, this air cushion serves to cause the cards to move over the pick-off without any retarding effect, and it also serves to move the trailing edge of the card upwardly from the pick-off without any fluttering effect. This means that the next succeeding card can move directly under the preceding card and strip it from the transport medium without any tendency for the succeeding card to engage the trailing edge of the preceding card, or for the cards to jam or become misaligned.

In the present invention, the air cushion set up at the surface of the pick-off causes, by Bernoulli effect, the card to hug the pick-off as it is moved over it by the transport medium until the trailing edge of the card reaches the pick-off. Then, as the trailing edge passes over the pick-off, the air cushion moves that edge away from the member without flutter and clear of the leading edge of the following card.

Figure 1:
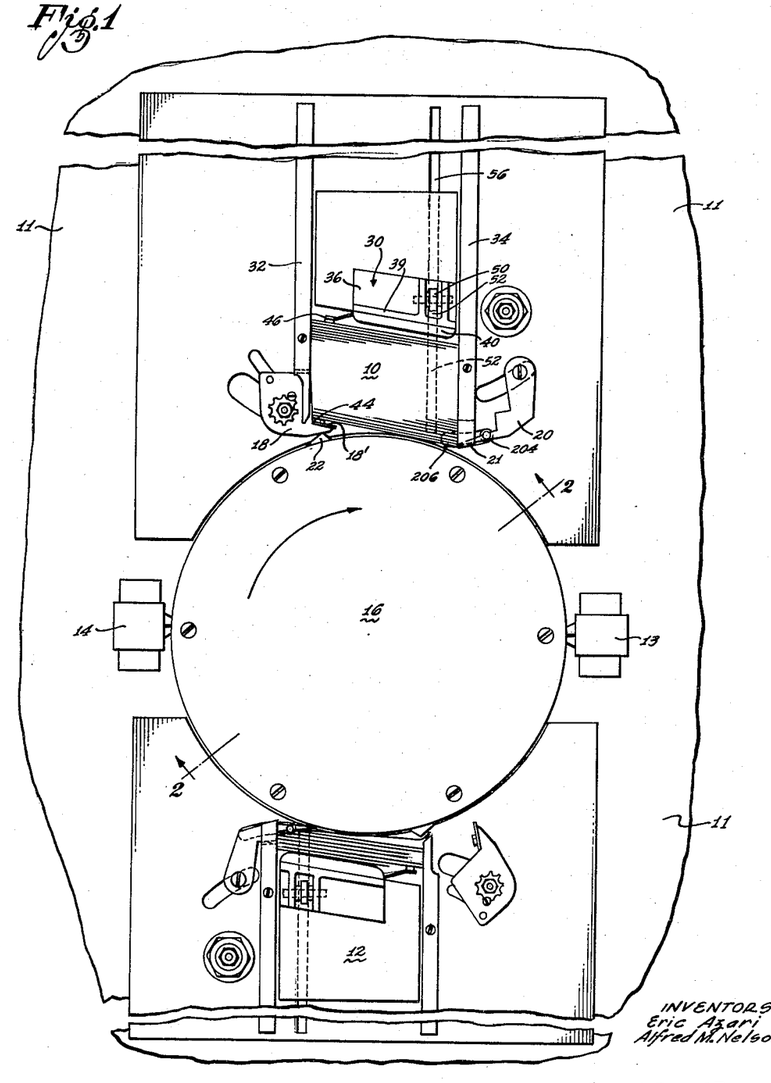
Figure 1 is a top plan view of a simplified card processing apparatus incorporating reversible feeding-stacking card holding stations constructed in accordance with the invention, this view illustrating a pair of such reversible card holding stations disposed adjacent a rotatable vacuum pressure transport drum; one of the stations being shown in a stacking mode for receiving cards from the drum and the other station being shown in a feeding mode for feeding cards successively to the transport drum.

In the apparatus of Figure 1, suitable transport means for the cards are provided. The transport means are preferably movable and, by way of illustration, may be movable in closed loops. One type of transport means may be a rotatable vacuum pressure drum 16. The drum 16 is mounted on a horizontal table top 11 for rotation in a clockwise direction about a vertical axis. The drum is constructed in a manner to be described so that it may exert a vacuum force at its peripheral surface. This vacuum force is made sufficient to enable the information storage cards to be firmly retained on that surface. These cards are retained on the peripheral surface of the drum at fixed angular positions about the drum as they are carried by the drum from one station to another.

A first card holding station 10 is mounted on the table top 11 with its mouth adjacent the peripheral edge of the transport drum 16. A second card holding station 12 is also mounted on the table top 11, and it also has its mouth positioned adjacent the periphery of the transport drum 16. As illustrated in Figure 1, the card holding stations 10 and 12 may be positioned diametrically opposite one another on opposite sides of the drum 16.

A first transducer means 13 is mounted on the table top 11, and this transducer is positioned between the card holding stations 10 and 12. A second transducer means 14 is also mounted on the table top 11, and the second transducer is shown as being on the opposite side of the drum from the transducer 13.

The transducers 13 and 14 may be any suitable and well-known type of electromagnetic transducer having a single head or having a plurality of heads. For example, these transducers may be constructed in a manner similar to that described in co-pending application Serial No. 550,296 filed December 1, 1956, by Alfred M. Nelson, et al. The transducers, of course, may be any other suitable type of electromagnetic transducers. Also, it is obvious that when other types of recordings are used, transducers appropriate to those types of recordings will be incorporated in the equipment.

The card holding station 10 has a vacuum pressure feed head 19 mounted adjacent its leading wall 32. The card holding station also includes a stack head 20 which is mounted adjacent its trailing wall 34. The construction and operation of the feed head 18 and of the stack head 20 may be similar to that described in co-pending application Serial No. 645,639 referred to previously.

It is believed unnecessary to include a detailed description of the construction of details of the feed head 18 and of the stack head 20 in the present case. Nor is it believed necessary to described in detail how these heads are coupled to appropriate cam-operated levers to enable the heads to be moved between their operative and stand-by positions. A suitable drive mechanism can be used which responds to electrical controls for causing the feed head 18 to move to an operative position and the stack head 20 simultaneously to be retracted to a stand-by position when the station is to be conditioned to its feeding mode; and to cause the stack head 20 to be moved forward to its operative position while the feed head 18 is retracted to its stand-by position when the station is conditioned to a stacking mode.

When the feed head is moved to its operative position, it is so moved between a bifurcated end portion of the wall 32, so that it extends partially across the mouth of the station 10 between the leading card of the station and the periphery of the drum 16, as shown in Figure 1. During this time, the stack head 20, as illustrated, is retracted clear of the drum 16 to its stand-by position. Conversely, when the station is to be conditioned to a stacking mode, as is the station 12 in Figure 1, the stack head is moved forward into proximity with the periphery of the drum 16 so that it encloses a throat formed between the guide rail 34 and the drum 16. During this latter condition, the feed head is retracted to its stand-by position.

The feed head 18 is controlled to exert a vacuum pressure at its surface 18' when the card holding station 10 is in its feeding mode and when the feed head is moved forward to its operative position. This vacuum pressure is exerted on the trailing portion of the front face of the leading card in the card holding station. The leading portion of the front face of this card rests on the peripheral edge of the drum 16, and the drum also exerts a vacuum force on the card.

The vacuum force exerted by the drum 16 tends to withdraw the leading card from the card holding station 10, whereas the vacuum force exerted on the card by the surface 18' of the feed head tends to retain the card in the card holding station. The force exerted by the feed head 18 is made the greater of the two so that this vacuum force is able to overcome the vacuum force exerted on the card by the drum 16. As long as the leading card is held in this manner in the card holding station 10, the other cards supported in stacked relationship in the station behind the leading card are also held in place.

When the vacuum pressure to the surface 18' of the feed head is momentarily interrupted, the leading card in the card holding station is withdrawn by the drum 16. The trailing wall 34 of the card holding station forms, as noted above and as will be more fully described, a throat with the peripheral surface of the drum 16. This throat has a width that is greater than the thickness of a single card but less than the thickness of two cards. This permits only one card at a time to be passed from the card holding station to the periphery of the drum 16 on the interruption of the vacuum pressure at the feed head 18.

In the stacking operational mode of the card holding station 10, the feed head 18 is withdrawn to a stand-by position and its vacuum pressure is turned off in the manner explained in co-pending application Serial No. 645,639 referred to above. The stack head is simultaneously moved to its operative position at which it fills the throat between the wall 34 and the periphery of the drum 16. As will be described, the stack head has a pair of fingers 21 which enter annular peripheral grooves in the transport drum 16, so that any cards transported to the mouth of the station 10 are engaged by the fingers and such cards move up over the fingers to be arrested by the body portion of the stack head.

A pick-off 22 is mounted adjacent the leading wall 32 of the card holding station 10. As noted above, the pick-off is displaced from the stack head a distance less than the length of the cards. The structural composition and the function of the pick-off 22 will be described in more detail subsequently.

The card holding station 12 may be constructed in a manner similar to the construction of the card holding station 10, and for that reason, its components are not numbered in Figure 1, and it will not be individually described. As mentioned previously, the card holding station 10 is illustrated in Figure 1 in its feeding mode, in which the feed head is moved forward to an operational position and the stack head 20 is withdrawn to a stand-by position. The card holder station 12, on the other hand and as also mentioned above, is illustrated as being in a stacking mode in which its stack head is moved forward to an operative position and its feed head is withdrawn to a stand-by position.

The feed head 18 and the stack head 20 of the card holding stations 10 and 12 may, as mentioned above, be operated by an appropriate system of cams and levers. The actual operation of these heads is fully described in the co-pending application Serial No. 645,639 referred to above.

The card holding station 10 in its feeding mode of operation may contain a group of information storage cards supported in the station in an upright stacked manner. In the feeding mode, the station 10 is conditioned to controllably feed the cards in a one-by-one sequence to a periphery of the transport drum 16. The card holding station 12 at this time is in its stacking mode so that cards transported to its stack head are deposited in that station. The cards from the card holding station 10 may now be controllably fed to the periphery of the transport drum 16 and transported by that drum past the transducer 13 for processing. Such processing, for example, may constitute the reading of information already recorded on the cards, or may constitute the writing of new information on selected ones of the cards. After the processing of the cards by the transducer 13, the cards may be deposited successively in the card holding station 12. Of course, many other operations may be made in handling of the cards in different types of processing systems and apparatus.

At the completion of the operations described above, that is, when the card holding station 10 is empty and all the cards have been transferred to the card holding station 12, the operational modes of the stations are reversed so that the cards are returned in their original order to the card holding station 10. The cards may be further processed by the transducer 14 as they are so returned to the card holding station 10.

A pusher member 30 is included in the card holding station 10, and a similar pusher is included in the card holding station 12. The pusher 30 is adapted to move along the floor of the card holding station 10 between the spaced parallel walls 32 and 34 which, as noted, constitute the leading and trailing side walls of the station. Thse walls are spaced apart a distance corresponding essentially to the length of each card supported in the station head.

The purpose of the pusher 30 is to maintain the cards in their stacked relation in the card holding station. For this reason, the pusher is biased in the direction of the mouth of the station by a suitable spring to resiliently urge the cards towards the mouth of the station. This moves the leading card against the surface 18' of the feed head 18 and against the peripheral surface of the drum 16 when the station is in its feeding mode.

The pusher 30 maintains the cards in a firm stacked condition, as noted above, and as the cards are fed out of the card holding station the pusher moves forward to exert a continuous pressure on the remaining cards and to hold these cards in a stacked relationship in the station. Conversely, when the cards are fed into the card holding station, the pusher 30 is moved back against its spring pressure so that it still exerts a force on the cards in the station to maintain them in a stacked condition.

The pusher member 30 may be constructed in a manner described in detail in co-pending application (M151). As fully described in that application, the pusher includes a bracket 39 which is secured to a base plate 36. The base plate is constructed of a material having a low co-efficient of friction so that it may freely slide back and forth along the floor of the station.

The bracket 39 of the pusher 30 also supports a rotatable member 50 which extends into a slot in the base plate 36. A resilient spring strip 52 extends upwardly through a slot 56 in the floor of the station 10 and around the rotatable member 50. This resilient spring has a tendency to coil itself into a coiled configuration, and in so doing it causes the rotatable member 50 to rotate and resiliently bias the pusher 30 towards the mouth of the station. By means of the pusher assembly, the cards in the station are held in an upright stacked condition and are continually biased toward the mouth of the station.

Figure 2:
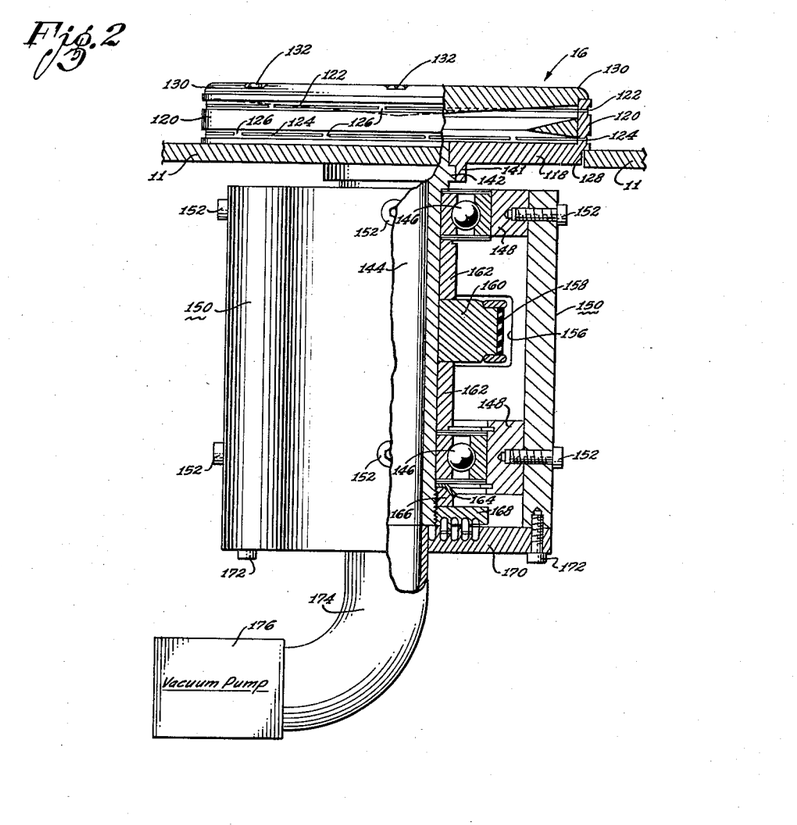
Figure 2 is a sectional view substantially on the line 2—2 of Figure 1 showing the construction of details of the rotatable drum of Figure 1, and illustrating the manner in which the drum may be controlled to establish a vacuum pressure at its peripheral surface in order that the information storage cards may be firmly held on that surface for transportation from one station to another in the card processing apparatus.

Details of the rotatable vacuum pressure transport drum 16 are shown in the view of Figure 2. The illustrated drum is similar in its construction to the rotatable vacuum pressure transport drum disclosed and claimed in co-pending application Serial No. 600,975 filed July 30, 1956, in the name of Loren R. Wilson.

As shown in Figure 2, the rotatable vacuum pressure transport drum 16 is made up of a lower section and an upper section. The lower section includes a disk-like bottom portion 118 and an annular side portion 120. The disk-like bottom portion and the annular side portion which make up the lower section of the drum are preferably integral with one another.

A pair of axially spaced peripheral orifices 122 and 124 extend through the side portion 120 of the lower section of the drum. Each of these orifices is discontinuous in that it is interrupted at spaced intervals about its angular length by ribs 126. These ribs are integral with the side portion 120.

Each of the orifices 122 and 124 has an external peripheral annular channel for receiving the fingers 21 of the stack head 20 as described above. As noted, this engagement of the fingers of the stack head with annular channels in the drum assists in the removal of the cards from the drum so that they may be deposited in the card holding station.

The disk-like bottom portion 118 of the lower section of the drum is undercut as shown at 128. This enables the edge of the table top to extend to beyond the outer limits of the side portion 120. Therefore, even without excessively close tolerances between the edge of the table top and the rotating surface of the drum 16, the cards supported endwise on the table top in the card holding stations 10 and 12 have no tendency to slip down between the table and the drum as they are transferred into and out of the station.

The upper section of the drum 16 is in the form of a disk-like member 130 which engages the annular side portion 120 of the lower section. The member 130 forms an enclosure with the lower section of the drum with the member 130 being positioned parallel to the disk-shaped bottom portion 118 of the lower section. The member 130 is held in place on the annular side portion 120 by a plurality of screws 132.

A deflector ring 140 is supported within the interior of the drum 16 in close fit with the inner surface of the annular side portion 120 of the lower section of the drum. This deflector ring is tapered towards the center of the drum to prevent turbulence and to provide a streamlined path for air that is drawn in through the peripheral orifices 122 and 124.

The bottom portion 118 of the lower section of the drum contains a central opening which is surrounded by an annular collar 141. The collar 141 engages a shoulder 142 which is provided at one end of a hollow shaft 144. The drum 16 is supported on the shoulder 142, and the end of the shaft 144 extends into the opening of the bottom portion 118 of the drum in press-fit with that portion. Therefore, rotation of the hollow shaft 144 causes the drum 16 to rotate. Also, the interior of the hollow shaft 144 communicates with the interior of the drum.

A pair of bearings 146 are provided at opposite ends of the shaft 144. The inner races of these bearings are mounted on their shaft, and the outer races of the bearings are supported by bushings 148. These bushings are secured to a housing 150 by means of a plurality of screws 152. An arcuate opening 156 is provided in the housing between the bearings 146. This opening enables a drive belt 158 to extend into the housing and around a pulley 160. The pulley 160 is keyed to the shaft 144 between the bearings 146, and it is held against axial movement by a pair of sleeves 162 which are supported on the shaft between the bearings 146. In this way, the shaft 144 and the drum 16 can be rotated by a suitable motor (not shown), the motor being mechanically coupled to the pulley 160 by the drive belt 158.

The bearings 146 and the sleeves 162 are held on the shaft 144 by a nut 166. This nut is screwed on a threaded portion at the lower end of the shaft, and a lock washer 164 is interposed between it and the lower bearing 146. A sealing disk 168 is also screwed on the threaded portion at the lower end of the shaft 144. The sealing disk 168 operates in conjunction with a bottom plate 170 to impede the movement of air between the interior of the housing 150 and the interior of the hollow shaft 144 when a pressure differential exists between the interior housing and the interior of the shaft.

The bottom plate 170 is mounted to the housing 150 by a plurality of screws 172, and this plate serves to close the lower end of the housing. A circular central opening is provided in the bottom plate 170, and a hollow conduit 174 extends into the opening in friction fit with the plate 170. The conduit 174 is axially aligned with the hollow shaft 144 so that air may be exhausted by a vacuum pump 176 from the hollow interiors of the shaft and the conduit. The vacuum pump 176 may be of any suitable known construction and for that reason is shown merely in block form.

The vacuum pump 176 draws air in through the annular peripheral orifices 122 and 124, through the interior of the drum 16, down the shaft 144 and through the conduit 174. This creates a vacuum pressure at the outer peripheral surface of the annular portion 120 of the lower section of the drum. This vacuum pressure serves to firmly retain the cards received from the card holding stations 12 and 13 on the peripheral surface of the drum as such cards are transported by the drum between these two stations.

Figure 3:
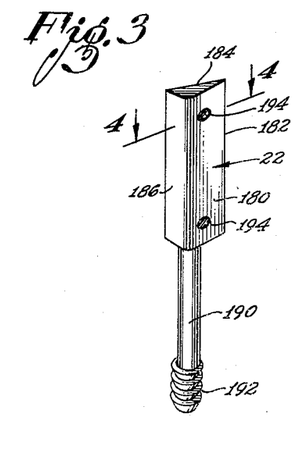
Figure 3 is an enlarged perspective view of a pneumatic type of pick-off member constructed in accordance with the invention and serving as a component of one embodiment of the improved card holding station of the present invention.
Figure 4:
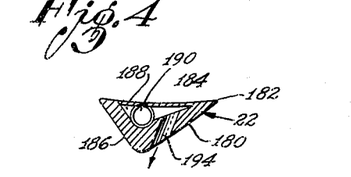
Figure 4 is a sectional view of the pick-off of Figure 3 and is taken substantially on the line 4—4 of Figure 3, the latter view illustrating one of the orifices extending through the pick-off and the manner in which it is inclined to a surface of the pick-off to provide a Bernoulli effect.

The constructional details of the pick-off member 22 are shown in more detail in Figures 3 and 4. As shown in these figures, the pick-off has a generally solid triangular configuration. It has a first surface 180 which is inclined outwardly from the periphery of the drum when the pick-off is in place and along which the cards ride as they are brought into position by the drum 16 across the mouth of the station. This surface has a sharp knife edge 182 which causes cards to be stripped from the surface of the drum so that such cards may ride up over the surface 180 of the pick-off. The pick-off also has a surface 184 which is in close proximity with the periphery of the drum when the pick-off is in position, and it has a third surface 186 which completes the triangle.

The pick-off 22 is hollow, and its various surfaces define an internal chamber 188 which serves as a plenum chamber. A pipeline 190 extends upwardly through the table top 11 and into the chamber 188. This pipeline has a nipple 192 formed at its lower end, and the nipple is adapted to receive a tube. The tube extends to a source of pressured fluid, such as air, for supplying pressurized fluid to the pick-off.

A pair of apertures or orifices 194 extend through the surface 180 of the pick-off in axial alignment with the annular peripheral orifices 122 and 124 of the drum 16 when the pick-off is mounted in place. The orifices 194 extend from the chamber 188 through the surface 180, and they are disposed at an angle to that surface, in the direction of motion of the cards over the surface 180 as shown in Figure 4, so that the streams of pressurized fluid emitted by the orifices may have a vector extending along the surface 180 in the direction of motion of the cards to create a Bernoulli effect with the cards for reasons to be described.

In a constructed embodiment of the pick-off member 20 shown in Figures 3 and 4, each of the holes 194 was provided with top diameter of .046 inch and a bottom diameter of .055 inch. Each of the holes in the constructed embodiment was displaced .080 inch from the crest of the member, and the center line of each hole was inclined towards the crest off the pick-off and defined an angle of 131° with the surface 18°. The height of the crest of the pick-off was of the order of .115 inch in the constructed embodiment, the width of the surface 180 from the edge 182 to the crest of the member was .505 inch, and the width of the surface 186 was .170 inch. The length of the member 22 conveniently should correspond essentially to the width of the drum 16. Also, a suitable fluid pressure has been found to be of the order of 30 pounds per square inch.

Figure 5:
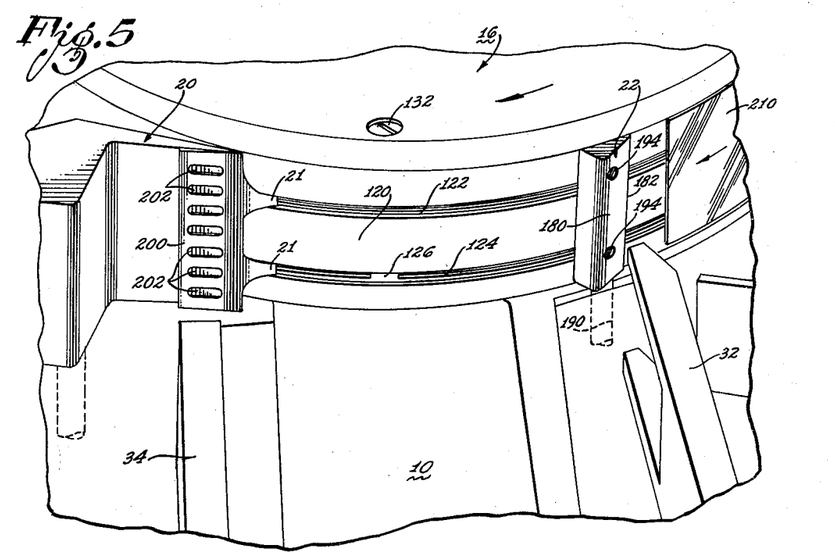
Figures 5, 6 and 7 are fragmentary perspective views of a card holding station constructed in accordance with the invention, these views illustrating in successive steps the manner in which the pick-off functions to deposit an information storage card in the station.
Figure 6:
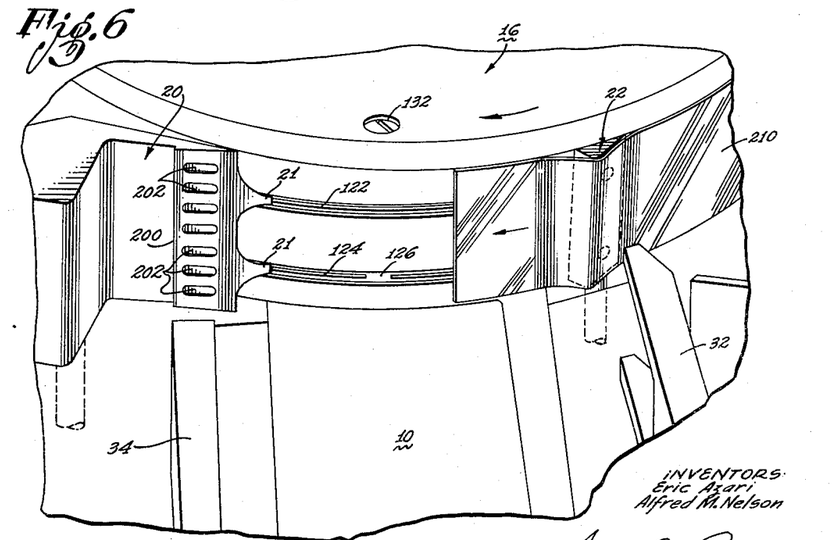
Figure 7:
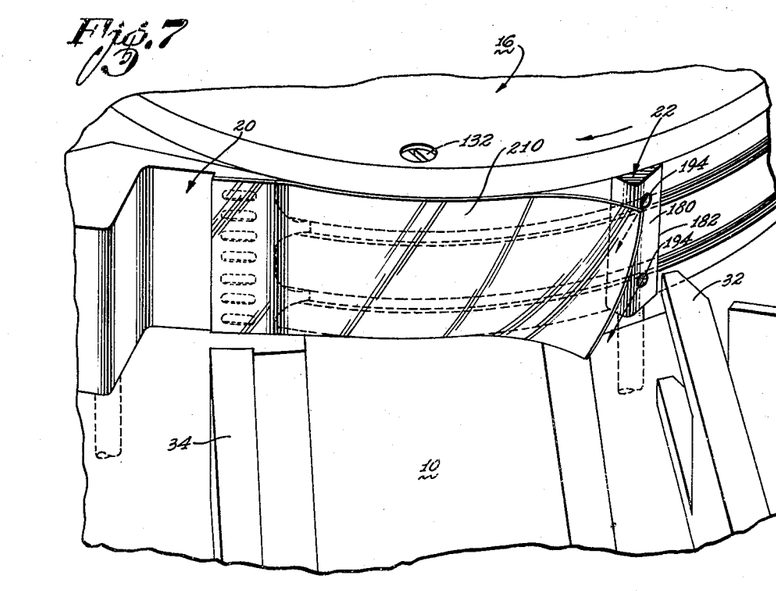

As shown in Figures 5, 6 and 7, the stack head 20 may be constructed in the manner described and claimed in copending application Serial No. 645,639 filed March 12, 1957, in the name of Alfred M. Nelson et al. That is, the stack head 20 may be equipped with a surface 200 which extends essentially tangential with the periphery of the vacuum pressure transport drum 16 when the stack head is in its operative position. When the stack head is in this position, its stacking fingers extend into the peripheral grooves adjacent the orifices 122 and 124 of the drum.

This surface 200 of the stack head is also provided with a plurality of orifices 202 which extend into an internal chamber in the stack head. This pipe-line extends down through the table top 11, and it moves in a slot 206 in the table top as the stack head is moved between its stand-by and operative position. The pipeline 204 is coupled to an appropriate vacuum pressure source so that a vacuum pressure may be established through the orifices 202 at the surface 200 of the stack head.

Then, in the manner fully described in the co-pending application, as each card rides up over the surface 200 to be arrested by the stack head, the vacuum pressure exerted by the orifices 202 produces a braking force on the cards so that they are brought to a stop without impacting the body portion of the stack head 20 to any excessive extent. This tends to reduce to a material extent the wear on the cards and eliminates any tendency for the leading edges of the cards to become damaged due to impact with the stack head.

As mentioned above, the views of Figures 5, 6 and 7 show the station 10 in a stacking mode and show a card 210 being carried by the drum 16 into position across the mouth of the station.

These views show the stack head 20 in its operative position with the fingers 21 engaging the peripheral grooves in the drum 16. In Figure 5, the card 210 is approaching the leading wall 32 of the station, and the card is firmly retained on the periphery of the drum by the vacuum force exerted on the cards through the peripheral annular orifices 122 and 124 of the drum. The card 210 meets the leading end 182 of the pick-off 22 and it rides upwardly over its surface 180 and across the orifices 194. As shown in Figure 6, the leading edge of the card 210 is immediately brought back against the periphery of the drum 16 by the vacuum force from the orifices 122 and 124 as the card moves outwardly over the back of the pick-off.

The pressurized streams of fluid emitted by the orifices 194 in the pick-off 22 provide a cushion of air for the card, and the inclination of these orifices 194 causes the streams to emerge at an angle to the surface 180. This creates a Bernoulli effect and causes the card to hug the surface of the pick-off 22. Therefore, as the card is moved to the left as shown in Figure 6, it moves across a cushion of air on the surface 180 of the pick-off 22 but there is no tendency for the air streams from the orifices 194 to blow the card off the pick-off.

The rotation of the drum now carries the card across the mouth of the station and upwardly over the fingers 21 of the stack head 20. During this time, the air cushion between the card and the pick-off 22 eliminates any frictional retarding force between the pick-off and the card. Therefore, there is no tendency for the pick-off to slow the card as it is carried across the mouth of the station. The card therefore is rapidly drawn across the surface 180 of the pick-off 20 until its leading end rides up over the surface 200 of the stack head 20 and is braked to a stop by the vacuum.

When the card reaches the stack head 20 and is arrested by the stack head 20 assembly, as shown in Figure 7, the pressurized air streams through the orifices 194 of the pick-off 22 blow the trailing edge of the card away from the pick-off. The card is held in the position shown in Figure 7 without any tendency for the trailing edge of the card to flutter. Then the next succeeding card is able to ride up over the pick-off into, for example, a position similar to the position shown in Figure 6 without any possibility of the succeeding card engaging the trailing edge of the preceding card. The succeeding card may now be carried by the drum 16 under the preceding card so that the preceding card is stripped from the periphery of the drum and deposited in the card holding station. The salient features of the illustrated pick-off 22 are an approach ramp which is formed by the face 180. This ramp must be tangential to the peripheral surface of the transport medium to allow cards to ride up over the pick-off. The orifices 194 are included in the approach ramp, and these orifices are covered by each card as it rides up over the ramp. As long as the orifices are covered by the card, the energizing air streams do not tend to blow the card off the ramp. Instead, and as described, a Bernoulli effect is created and the card hugs the pick-off as it is moved along the air-bearing, effectively lubricated surface of the ramp by the transport medium.

The pick-off also requires a departure ramp which forms an apex with the approach ramp. This departure ramp is formed by the surface 186. When the leading edge of the card is moved over the apex it extends down over the departure ramp due to the flexibility of the card and moves again under the influence of the vacuum pressure at the surface of the transport medium. So long as the trailing end of the card is also under the influence of this vacuum pressure, the pick-off merely forms a bulge in the card and the card is moved along over its air lubricated surface by the transport medium.

The provision of the improved card holding station of the invention with the inclusion of the pneumatic pick-off component 22 enables cards to be rapidly transported to the station and to be deposited in the station. The speed with which cards can be deposited into the station from the drum is greatly increased as compared with the prior art arrangements because there are no frictional losses between the cards and the pick-off, and because the composition of the pick-off assembly causes cards to be handled in such a manner that there is no tendency for them to jam with one another. However when the trailing edge of the card rides up over the approach ramp and out of the influence of the vacuum pressure of the transport medium, the departure ramp functions to tilt the trailing end of the card to move that end outwardly away from the surface of the approach ramp. This brings the trailing end of the card under the blower action of the air streams emerging from the pick-off.

The leading wall of the station 32 is preferably so angled with respect to the energizing air streams from the pick-off, and the relative positions of the pick-off and this wall are preferably such, that the energizing air streams from the pick-off are directed along the inner surface of this wall. This assures that the trailing end of each card which comes under the blower action of the air streams from the pick-off will be forced directly into the station.

It should be appreciated that any suitable type of transport means may be used and that the transport means may be stationary as well as movable. It should also be appreciated that the term "card" as used in the specification and claims includes any type of discreet elements capable of recording and subsequently reproducing bits of information.

We claim:

1. In apparatus for processing data on a plurality of information storage cards, the combination of: transport means for the cards, card-holding means having a mouth positioned adjacent the transport means and constructed to hold the cards in stacked relationship, a pick-off member positioned adjacent the mouth of the card-holding means and disposed relative to the transport means to obtain a transfer of the cards from the transport means to the pick-off member and having a surface along which the cards are transported, and means for producing a force against the cards at said surface of said pick-off member in a direction to facilitate the movement of cards along said surface of said member, and means disposed relative to the transport means and the card-holding means to obtain a transfer of cards into the card-holding means and operative in conjunction with the pick-off means to obtain a transfer of the cards into the card-holding means in the same order as the transport of the cards.

2. In apparatus for processing data on a plurality of information storage cards, the combination of: transport means for the cards, card-holding means having a mouth positioned adjacent the transport means and constructed to hold the cards in stacked relationship, a pick-off member positioned at the mouth of the card-holding means and having a hollow interior and having a surface with at least one orifice extending through the member into communication with the hollow interior of the member, the member being positioned relative to the transport means to cause the transported cards to move from the transport means and along said surface of the pick-off member, said orifice extending through the pick-off member at a particular angle inclined to the movement of cards over said surface to facilitate the movement of the cards along the surface of the member, and means coupled to the member for introducing a pressurized fluid into said hollow interior of said pick-off member for the passage of an angled stream of pressurized fluid through the orifice and against the cards on the surface of the pick-off member to facilitate the movement of cards along said surface, and transfer means operatively coupled to the transport means at a particular position relative to the pick-off member and the card-holding means and operative in conjunction with the pick-off member to obtain a transfer of cards into the card holding means from the transport means in the same order as the transport of the cards.

3. In apparatus for processing data on a plurality of information storage cards, the combination of: transport means for the cards, card-holding means having a mouth positioned adjacent the transport means and constructed to hold cards in the plurality in stacked relationship, stacking means positioned at the mouth of the card-holding means for arresting cards on the transport means to obtain a controlled transfer of cards from the transport means to the card-holding means, pick-off means positioned at the mouth of the card-holding means for causing the transported cards to move over a surface thereof for a displacement outwardly from the transport means of the trailing end of each card arrested by the stacking means, and means coupled to the pick-off means for providing a pressurized fluid at said surface of the pick-off means to facilitate an orderly transfer of cards from the transport means into the card-holding means.

4. In apparatus for processing data on a plurality of information storage cards, the combination of: transport means for the cards, card-holding means having a mouth positioned adjacent the transport means, stacking means positioned at the mouth of the card-holding means for arresting cards on the transport means to control the transfer of cards from the transport means to the card-holding means, a pick-off member positioned at the mouth of the card-holding means and having an approach surface with a major component tangential to the transport means and having a departure surface forming an apex with the approach surface, the pick-off member having a hollow interior and having in the approach surface at least one orifice extending through the member into communication with the hollow interior thereof, said pick-off member being positioned to cause cards transported by the transport means to move upwardly over the approach surface and downwardly over the departure surface for an outward displacement from the transport means of the trailing end of each card arrested by the stacking means, and means coupled to the pick-off member for introducing a pressurized fluid into the hollow interior of the pick-off member for the passage of a stream of pressurized fluid through the orifice to facilitate the sequential stacking of the cards in the card-holding means in an order related to the movement of the cards to the card-holding means.

5. In apparatus for processing data on a plurality of information storage cards, the combination of: transport means for the cards, card-holding means having a mouth positioned adjacent the transport means, stacking means positioned at the mouth of the card-holding means for arresting cards on the transport means to control the transfer of cards from the transport means to the card-holding means, a pick-off member positioned at the mouth of the card-holding means and having a hollow interior and having an approach surface with at least one orifice extending through the member into communication with the hollow interior thereof and further having a departure surface forming an apex with the approach surface, the pick-off member being positioned to cause cards transported by the transport means to move upwardly over said approach surface thereof and downwardly over said departure surface for an outward displacement from the transport means of the trailing end of each card arrested by the stacking means, said orifice extending through the pick-off member at an angle inclined in the direction of movement of the cards along the approach surface of the pick-off member, and means coupled to the pick-off member for introducing a pressurized fluid into said hollow interior of the pick-off member for the passage of an angled stream of pressurized fluid through the orifice to facilitate the movement of the cards along the surfaces of the pick-off member.

6. In apparatus for processing data on a plurality of information storage cards, the combination of: means including a movable transport medium for providing a movement of the cards with the transport means, card-holding means having a trailing wall and a leading wall with respect to the motion of the cards transported by the transport medium and having a mouth positioned adjacent the transport medium, a stack head positioned at the mouth of the card-holding means adjacent the trailing wall thereof for arresting cards on the transport medium as such cards are transported by the transport medium to the mouth of the card-holding means, a pick-off member positioned at the mouth of the card-holding means adjacent the leading wall thereof for causing cards transported by the transport medium to move over a surface of the pick-off member for in outward displacement from the transport means of the trailing end of each card arrested by the stack head, and means coupled to the pick-off member for directing a pressurized fluid outwardly from said surface of the pick-off member to facilitate the transfer of cards from the transport medium to the card-holding means in an order related to the movement of the cards by the transport means.

7. In apparatus for processing data on a plurality of information storage cards, the combination of: means including a transport medium movable in a closed loop for providing a movement of the cards with the transport medium, a card-holding means having a trailing wall and a leading wall with respect to the motion of the cards transported by the transport medium and having a mouth positioned adjacent the transport medium, a stack head positioned at the mouth of the card-holding means and adjacent the trailing wall thereof for arresting cards on the transport medium as such cards are transported thereby to the mouth of the card-holding means, a pick-off member positioned at the mouth of the card-holding means and adjacent the leading wall thereof, said pick-off member having a hollow interior and having an approach surface substantially tangential to the transport medium with at least one orifice extending through the member into communication with the hollow interior thereof in axial alignment with the inner surface of said leading wall, said pick-off member further having a departure surface forming an apex with the approach surface, said pick-off member being positioned to cause cards transported by the transport medium to move upwardly over the approach surface and downwardly over the departure surface of the pick-off member for an outward displacement from the transport medium of the trailing edge of each card arrested by the stack head, and means coupled to the hollow interior of the pick-off member for introducing a pressurized fluid into said hollow interior of the pick-off member for the passage of a stream of pressurized fluid outwardly through the orifice at an angle to the motion of cards over the pick-off member and in the direction of such motion to lift the trailing edge of each card outwardly from the pick-off member for facilitating the transfer of cards into the card-holding means in an order related to the movement of the cards by the transport means.

8. In apparatus for processing data on a plurality of information storage cards, the combination of: means including a movable transport medium for providing a movement of the cards with the transport medium, card-holding means having a trailing wall and a leading wall with respect to the motion of the cards transported by the transport medium and having a mouth positioned adjacent the transport medium, a stack head positioned at the mouth of the card-holding means and adjacent the trailing wall thereof for arresting cards on the transport medium as such cards are transported thereby to the mouth of the card-holding means, a pick-off member positioned at the mouth of the card-holding means and adjacent the leading wall thereof, said pick-off member having a hollow interior and having a surface extending away from the surface of the transport medium at an angle thereto, the surface of the pick-off member being provided with at least one orifice extending therethrough into the hollow interior thereof at an angle inclined relative to said surface of the pick-off member and in the direction of motion of the cards, said pick-off member being positioned to cause cards transported by the transport medium to move over said surface of the pick-off for an outward displacement from the transport medium of the trailing edge of each card arrested by the stack head, and means coupled to the hollow interior of the pick-off member for introducing a pressurized fluid into said hollow interior of the pick-off member for the passage of an angled stream of pressurized fluid outwardly through the orifice in a direction to facilitate the movement of said cards along the pick-off member and to facilitate the stacking of the cards in an order related to the movement of the cards by the transport medium.

9. In apparatus for processing data on a plurality of information storage cards, the combination of: means including a rotatable vacuum pressure transport drum for carrying the cards on the peripheral surface of the drum, a card-holding station having a trailing wall and a leading wall with respect to the direction of rotation of the transport drum and having a mouth positioned adjacent the peripheral surface of the transport drum, a stack head positioned at the mouth of the card-holding station and adjacent the trailing wall thereof and having a portion extending into close proximity with the peripheral surface of the transport drum for arresting cards on the transport drum as such cards are carried thereby to the mouth of the card-holding station, a pick-off member positioned at the mouth of the card-holding station and adjacent the leading wall thereof and in close proximity with the peripheral surface of the transport drum, said pick-off member having a hollow interior and having a surface inclined to the peripheral surface of the drum and extending outwardly therefrom, said surface of the pick-off member having a plurality of orifices extending therethrough into communication with the hollow interior thereof at an inclined angle relative to the inclined surface of the pick-off member and in the direction of movement of the cards, said pick-off member being positioned to cause cards transported by the transport drum to move over said surface of the pick-off member for an outward displacement from the transport medium of the trailing edge of each card arrested by the stack head, and means coupled to the hollow interior of the pick-off member for introducing a pressurized fluid into said hollow interior of the pick-off member for a passage of angled streams of pressurized fluid outwardly through the orifices to facilitate the movement of the cards along the inclined surface of the pick-off member and to facilitate a stacking of the cards in the card-holding means in an order related to the movement of the cards by the transport means.

10. In apparatus for processing data on a plurality of information storage cards, the combination of: a transport medium for the cards, card-holding means having a trailing wall and a leading wall with respect to the motion of cards transported by the transport medium and having a mouth positioned adjacent the transport medium, a stack head movable between a stand-by position and an operative position, said stack head being positioned at the mouth of the card-holding means and adjacent the trailing wall thereof for arresting cards on the transport medium when the stack head is in its operative position, a feed head movable between a stand-by position and an operative position, said feed head being positioned at the mouth of the card-holding means and adjacent the leading wall thereof for controlling the transfer of cards from the card-holding means to the transport medium when the feed head is in its operative position, a pick-off member positioned at the mouth of the card-holding means and adjacent the leading wall thereof, said pick-off member having a hollow interior and having a surface extending away from the surface of the transport medium at an angle thereto, the surface of the pick-off member being provided with at least one orifice extending therethrough into the hollow interior thereof at an angle inclined relative to said surface of the pick-off member and in the direction of motion of the cards, said pick-off member being positioned to cause cards transported by the transport medium to move over said surface of the pick-off member for an outward displacement from the transport medium of the trailing edge of each card arrested by the stack head, and means coupled to the hollow interior of the pick-off member for introducing a pressurized fluid into said hollow interior for the passage of an angled stream of pressurized fluid outwardly through the orifice in a direction to facilitate the movement of the cards along the pick-off member and to facilitate the stacking of the cards in the card-holding means.

11. The combination defined in claim 10 in which the stack head includes a surface adapted to extend in essentially tangential relation to the transport medium when the stack head is in its operative position, said surface of the stack head having at least one orifice therein, and means for establishing a vacuum pressure through said last named orifice to brake the cards arrested by the stack head.

12. In apparatus for processing data on a plurality of information storage cards, the combination of: transport means for the cards, card-holding means disposed relative to the transport means to receive cards from the transport means, stacking means disposed in coupled relationship to the transport means and the card-holding means to obtain a transfer of the leading ends of the cards from the transport means to the card-holding means for a movement of the cards into the card-holding means, pick-off means disposed in coupled relationship to the transport means for a displacement of the trailing end of each card from the transport means during the transfer of the cards into the card-holding means, and means including pneumatic means associated with the pick-off means for exerting a force against the trailing ends of the cards at the position of the pick-off means and in a direction to facilitate the transfer of cards from the transport means to the card-holding means.

13. In apparatus for processing data on a plurality of information storage cards, the combination of: transport means for the cards, pick-off means disposed in coupled relationship to the transport means for directing the cards to the pick-off means from the transport means and provided with a particular surface disposed relative to the transport means for a movement of the cards along such surface upon the transfer of the cards to the pick-off means, and means associated with the pick-off means for creating a Bernoulli effect on the particular surface of the pick-off means to facilitate the movement of the cards along such surface, the length of the pick-off means being less than the length of the cards to obtain a disposition of at least a portion of the cards on the transport means at all times during the movement of the cards along the particular surface of the pick-up means.

14. In apparatus for processing data on a plurality of information storage cards, the combination of: movable transport means constructed to provide a movement of the cards in accordance with the movement of the transport means, pick-off means disposed in coupled relationship to the transport means to obtain a transfer of the cards to the pick-off means from the transport means and provided with a particular surface disposed relative to the transport means for directing the cards along the particular surface upon the transfer of the cards to the pick-off means, and pneumatic means coupled to the pick-off means for creating a pneumatic force on the particular surface of the pick-off means in a direction to facilitate the movement of the cards from the transport means and along the particular surface, the pick-off means having a length less than the length of the cards to provide for a disposition of at least a portion of the cards on the transport means at all times during the movement of the cards along the particular surface of the pick-off means.

15. In apparatus for processing data on a plurality of information storage cards, the combination of: transport means for the cards, card-holding means disposed relative to the transport means to receive cards from the transport means and having first and second spaced walls for the positioning of the cards between the walls, stacking means disposed in coupled relationship to the transport means and the card-holding means at a position near the first wall of the card-holding means to act on the leading ends of the cards for a transfer of the cards from the transport means into the card-holding means, pick-off means disposed in coupled relationship to the transport means at a position near the second wall of the transport means and provided with a particular surface to lift the trailing ends of the cards from the transport means during the stacking of the cards in the card-holding means, and means coupled to the pick-off means for creating a Bernoulli effect on the particular surface of the pick-off means to facilitate the movement of the cards along the pick-off means to a position for transfer of the cards from the transport means to the card-holding means.

16. The combination set forth in claim 15 in which the means coupled to the pick-off means creates a pneumatic force on the particular surface of the pick-off means in a direction to facilitate the movement of the cards along the particular surface and the stacking of the cards in the card-holding means in an order related to the movement of the cards toward the card-holding means.

17. In apparatus for processing data on a plurality of information storage cards, the combination of: a transport medium for the cards, card-holding means having a trailing wall and a leading wall with respect to the motion of the cards transported by the transport medium and having a mouth positioned adjacent the transport medium, a stack head positioned at the mouth of the card-holding means and adjacent the trailing wall thereof for arresting cards on the transport medium as such cards are transported thereby to the mouth of the card-holding means, a pick-off member positioned at the mouth of the card-holding means and adjacent the leading wall thereof, said pick-off member having a hollow interior and having an approach ramp tangential to the surface of the transport medium to receive cards transported by the transport medium to the mouth of the station, said pick-off member further having a departure ramp forming an apex with the approach ramp, the approach ramp being provided with at least one orifice extending into the hollow interior of the pick-off member at an angle inclined to the approach ramp and in the direction of the motion of the cards, and means coupled to the hollow interior of the pick-off member for introducing a pressurized fluid into said hollow interior for the passage of an angled stream of pressurized fluid outwardly through the orifice.

18. The combination defined in claim 17 in which the pick-off member is positioned relative to the leading wall of the card-holding station, and the leading wall is angled so as to enable the stream of pressurized fluid from said orifice to be directed along the inner surface of the leading wall.

19. In apparatus for use with transport means constructed to obtain a movement of a plurality of cards, a pick-off member disposed in coupled relationship to the transport means to obtain a transfer of cards to the pick-off member from the transport means, the pick-off member being provided with a first surface having a major component tangential to the transport means and being provided with a second surface transverse to the first surface and having a major component perpendicular to the transport means, the first surface of the pick-off means being constructed to obtain the production of a pneumatic force against the cards travelling on the first surface, the second surface of the pick-off means being disposed at a position trailing the first surface in the direction of movement of the cards, and means coupled to the first surface of the transport means for obtaining the production of the pneumatic force against the cards.

20. In apparatus for use with transport means constructed to obtain a movement of a plurality of cards, a pick-off member constructed and disposed relative to the transport means to obtain a transfer of cards from the transport means for movement along the pick-off member and for return to the transport means after movement along the pick-off member, the pick-off member being provided with first and second surfaces disposed in transverse relationship to each other to guide the cards along the pick-off member, the second surface trailing the first surface in the direction of movement of the cards, the first surface extending from the transport means and the second surface extending toward the transport means in the direction of movement of the cards, there being at least one orifice in the first surface for directing a fluid under pressure against the cards on the surface to facilitate the movement of the cards along the first surface, and means for introducing fluid under pressure through the orifice.

21. The combination set forth in claim 20 in which the total length of the first and second surfaces of the pick-off member is less than the lengths of the cards.

References Cited in the file of this patent
UNITED STATES PATENTS

| | | |
|---|---|---|
| 2,138,178 | Lang | Nov. 29, 1938 |
| 2,332,863 | Luehrs | Oct. 26, 1943 |
| 2,752,154 | Nelson | June 26, 1956 |
| 2,811,352 | Bornemann | Oct. 29, 1957 |